United States Patent
Pan

(10) Patent No.: US 10,600,158 B2
(45) Date of Patent: Mar. 24, 2020

(54) METHOD OF VIDEO STABILIZATION USING BACKGROUND SUBTRACTION

(71) Applicant: CANON KABUSHIKI KAISHA, Tokyo (JP)

(72) Inventor: Ruimin Pan, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 15/831,102

(22) Filed: Dec. 4, 2017

(65) Prior Publication Data
US 2019/0172184 A1 Jun. 6, 2019

(51) Int. Cl.
G06T 5/00 (2006.01)
G06T 5/50 (2006.01)
(Continued)

(52) U.S. Cl.
CPC ............ *G06T 5/003* (2013.01); *G06T 5/006* (2013.01); *G06T 5/50* (2013.01); *G06T 7/11* (2017.01); *G06T 7/155* (2017.01); *G06T 7/194* (2017.01); *G06T 7/254* (2017.01); *G06T 7/277* (2017.01); *G06T 2207/10016* (2013.01);
(Continued)

(58) Field of Classification Search
CPC ........... G06T 5/00; G06T 5/001; G06T 5/002; G06T 5/003; G06T 5/004; G06T 5/005; G06T 5/006; G06T 5/50; G06T 5/40; G06T 7/194; G06T 7/187; G06T 7/155; G06T 7/13; G06T 7/143; G06T 7/149; G06T 7/20; G06T 7/215; G06T 7/246
USPC ........ 382/275, 232, 236, 254–255, 260–261, 382/264–266, 107
See application file for complete search history.

(56) References Cited

U.S. PATENT DOCUMENTS 9,674,442 B2 6/2017 Saitwal et al.
2003/0156203 A1* 8/2003 Kondo ............... H04N 5/262
348/222.1
(Continued)

OTHER PUBLICATIONS

Yifei Lou, et al., "Video stabilization of atmospheric turbulence distortion", Inverse problems and imaging, vol. 7, No. 3, pp. 839-861, 2013.
(Continued)

*Primary Examiner* — Dwayne D Bost
*Assistant Examiner* — Stephen M Brinich
(74) *Attorney, Agent, or Firm* — Canon U.S.A., Inc. IP Division

(57) ABSTRACT

The present disclosure provides a method of correcting for a turbulence effect in a video comprising a plurality of frames. The method comprises determining a first background region and a region corresponding to a moving object in a first frame of the plurality of frames using a predetermined background model. A second background region in a second frame of the plurality of frames is then determined using the predetermined background model. A turbulence-corrected background region from the first background region and the second background region is generated and the region corresponding to the moving object and the turbulence-corrected background region is fused to form a turbulence-corrected frame. The method then updates the predetermined background model based on the turbulence-corrected frame and corrects for the turbulence effect in the second frame using the updated predetermined background model.

21 Claims, 16 Drawing Sheets

(51) Int. Cl.
    *G06T 7/194* (2017.01)
    *G06T 7/155* (2017.01)
    *G06T 7/11* (2017.01)
    *G06T 7/254* (2017.01)
    *G06T 7/277* (2017.01)

(52) U.S. Cl.
    CPC .............. *G06T 2207/10024* (2013.01); *G06T 2207/20201* (2013.01); *G06T 2207/20221* (2013.01); *G06T 2207/30232* (2013.01)

(56) References Cited

U.S. PATENT DOCUMENTS

2009/0060275 A1* 3/2009 Hamada ................ G06T 3/0087
  382/103
2009/0278928 A1* 11/2009 McCloskey ............... G06T 5/50
  348/143

OTHER PUBLICATIONS

M. Braham, et al., "Semantic background subtraction", ICIP, pp. 4552-4556, Sep. 2017.
C. Carrano, et al., "Adapting high-resolution speckle imaging to moving targets and platforms", SPIE Defense and Security Symposium, Orlando, Apr. 2004.
C. Stauffer, et al., "Adaptive background mixture models for real-time tracking", Computer Vision and Pattern Recognition, 1999.
P. Perez, et al., "Poisson image editing", Proceedings of SIGGRAPH, vol. 22, Iss. 3, Jul. 2003, pp. 313-318.

\* cited by examiner

METHOD OF VIDEO STABILIZATION USING BACKGROUND SUBTRACTION

TECHNICAL FIELD

The present invention relates to methods of video stabilization and artefacts removal for turbulence effect compensation in long distance imaging.

BACKGROUND

In long distance imaging applications, such as long distance surveillance, a captured video can appear blurry, geometrically distorted, and unstable due to camera movement, atmospheric turbulence, or other disturbance.

Typically, atmospheric turbulence is the main reason why geometric distortion and blur exist in the captured videos. Long distance surveillance over water or hot surface is particularly challenging as the refractive index along the imaging path varies greatly and randomly. The lens quality and the sensor size usually have less impact on the resolution of long distance imaging.

Atmospheric turbulence is mainly due to fluctuation in the refractive index of atmosphere. The refractive index variation of the atmosphere involves many factors including wind velocity, temperature gradients, and elevation.

Light in a narrow spectral band approaching the atmosphere from a distant light source, such as a star, is well modelled by a plane wave. The planar nature of this wave remains unchanged as long as the wave propagates through free space, which has a uniform index of refraction. The atmosphere, however, contains a multitude of randomly distributed regions of uniform index of refraction, referred to as turbulent eddies. The index of refraction varies from eddy to eddy. As a result, the light wave that travels in the atmosphere from a faraway scene is no longer planar by the time the light wave reaches the camera. FIG. 1 illustrates the effect of Earth's atmosphere on the wavefront of a distant point source. In FIG. 1, after the plane wave passes through a turbulent layer in the atmosphere, its wavefront becomes perturbed. Excursions of this wave from a plane wave are manifested as random aberrations in imaging systems. The general effects of optical aberrations include broadening of the point spread function and lower resolution. Although some blurring effects can be corrected by fixed optics in the design of the lens, the spatially random and temporally varying nature of atmospheric turbulence makes it difficult to correct for.

Traditionally in long distance imaging, multiple frames (typically 10-100 frames) are needed to remove the turbulence effect. For example, Lou et al., "Video Stabilization of Atmospheric Turbulence Distortion," Inverse Problems and Imaging, vol. 7, no. 3, pp. 839-861, 2013" use a spatial and temporal diffusion method to reduce geometric distortion in each captured frame and stabilize the video across frames at the same time. Other methods, such as the bispectrum method by Carrano et al. J. Brase, "Adapting high-resolution speckle imaging to moving targets and platforms", SPIE Defense and Security Symposium, Orlando, April, 2004", try to extract the long exposure point spread function (PSF) of the atmospheric turbulence from a large number of frames and apply the PSF to deblur each frame.

In a typical long distance surveillance situation, however, because the region of interest is often around a moving object, such as a person, a vehicle or a vessel, multiple frame based turbulence correction methods have problems with the blurred moving object. This defeats the purpose of video surveillance as details on the moving object are often the goal of surveillance.

One solution is to detect and extract the moving object in the video as a foreground. This enables the still background and the moving foreground to be processed separately. While this method works reasonably well in many short distance video surveillance applications, it still faces the quasi-periodic disturbance from atmospheric turbulence. In other words, due to turbulence effect in the captured frames, background extraction becomes unreliable. In particular, due to the geometric distortion and blurring caused by turbulence, still background objects such as mountains and roads appear to be moving, which cause many false positive errors in moving object detection.

Other methods avoid problematic regions in the frame by monitoring certain features such as SURF (speeded up robust features) features and choosing regions in the frame with dense SURF features to perform rigid frame registration. However, because the geometric distortion caused by atmospheric turbulence is random and local, rigid frame registration does not correct turbulence effect. Furthermore, SURF features are not consistent in a blurred and distorted video frame with turbulence.

Recently, new methods correcting for false positive and false negative error in moving object detection are proposed where convolutional neural network (CNN) is used to perform semantic segmentation. That is, regions in each frame are classified semantically as people, car, boat, bicycle, and the like. Because video surveillance applications often have a clearly defined monitoring task, the foreground that gets detected usually belongs to a very limited collection of objects. In this limited application, one can simply decide that if a blob in the frame is not semantically understood as part of a group of objects of interest, it can be considered a background. For example, if in a video surveillance task, vehicles are the main target, any objects that are not classified by the CNN as vehicles will be treated as background, even if they were classified as foreground by the base background detection algorithm.

The limitation of the above method using CNN is twofold: first, it requires a clearly defined class of objects and there is no capacity in the system to monitor unexpected objects; furthermore, this requires a large amount of training data, training time and extensive computation power.

SUMMARY

It is an object of the present invention to substantially overcome, or at least ameliorate, one or more disadvantages of existing arrangements.

Aspects of the present disclosure provide a real-time video stabilization method for handling long distance surveillance with severe turbulence effect. Aspects of the present disclosure compensate for the geometric distortion and blur without artefacts around moving objects.

According to an aspect of the present disclosure, there is provided a method of correcting for a turbulence effect in a video comprising a plurality of frames, the method comprising: determining a first background region and a region corresponding to a moving object in a first frame of the plurality of frames using a predetermined background model; determining a second background region in a second frame of the plurality of frames using the predetermined background model; generating a turbulence-corrected background region from the first background region and the second background region; fusing the region corresponding to the moving object and the turbulence-corrected background region to form a turbulence-corrected frame; updating the predetermined background model based on the turbulence-corrected frame; and correcting for the turbulence effect in the second frame using the updated predetermined background model.

According to another aspect of the present disclosure, there is provided a non-transitory computer readable medium comprising a software application program that is executable by a processor, wherein, when executing the software application program, the processor performs a method comprising the steps of: determining a first background region and a region corresponding to a moving object in a first frame of the plurality of frames using a predetermined background model; determining a second background region in a second frame of the plurality of frames using the predetermined background model; generating a turbulence-corrected background region from the first background region and the second background region; fusing the region corresponding to the moving object and the turbulence-corrected background region to form a turbulence-corrected frame; updating the predetermined background model based on the turbulence-corrected frame; and correcting for the turbulence effect in the second frame using the updated predetermined background model.

According to another aspect of the present disclosure, there is provided a device comprising a processor and a computer readable medium in communication with the processor, the computer readable medium comprising a software application program that is executable by the processor, wherein, when executing the software application program, the processor performs a method comprising the steps of: determining a first background region and a region corresponding to a moving object in a first frame of the plurality of frames using a predetermined background model; determining a second background region in a second frame of the plurality of frames using the predetermined background model; generating a turbulence-corrected background region from the first background region and the second background region; fusing the region corresponding to the moving object and the turbulence-corrected background region to form a turbulence-corrected frame; updating the predetermined background model based on the turbulence-corrected frame; and correcting for the turbulence effect in the second frame using the updated predetermined background model.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
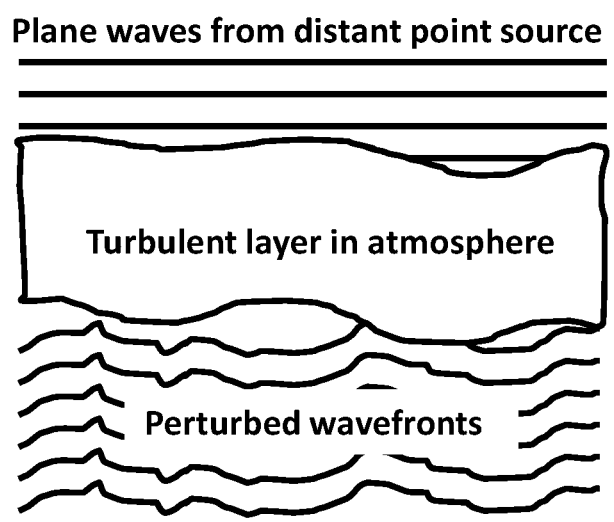
FIG. 1 illustrates the effect of atmospheric turbulence on the wavefront of a plane wave.

Where reference is made in any one or more of the accompanying drawings to steps and/or features, which have the same reference numerals, those steps and/or features have for the purposes of this description the same function(s) or operation(s), unless the contrary intention appears.
Structural Context FIGS. 13A and 13B depict a general-purpose computer system 1300, upon which the various arrangements described can be practiced.

Figure 13A:
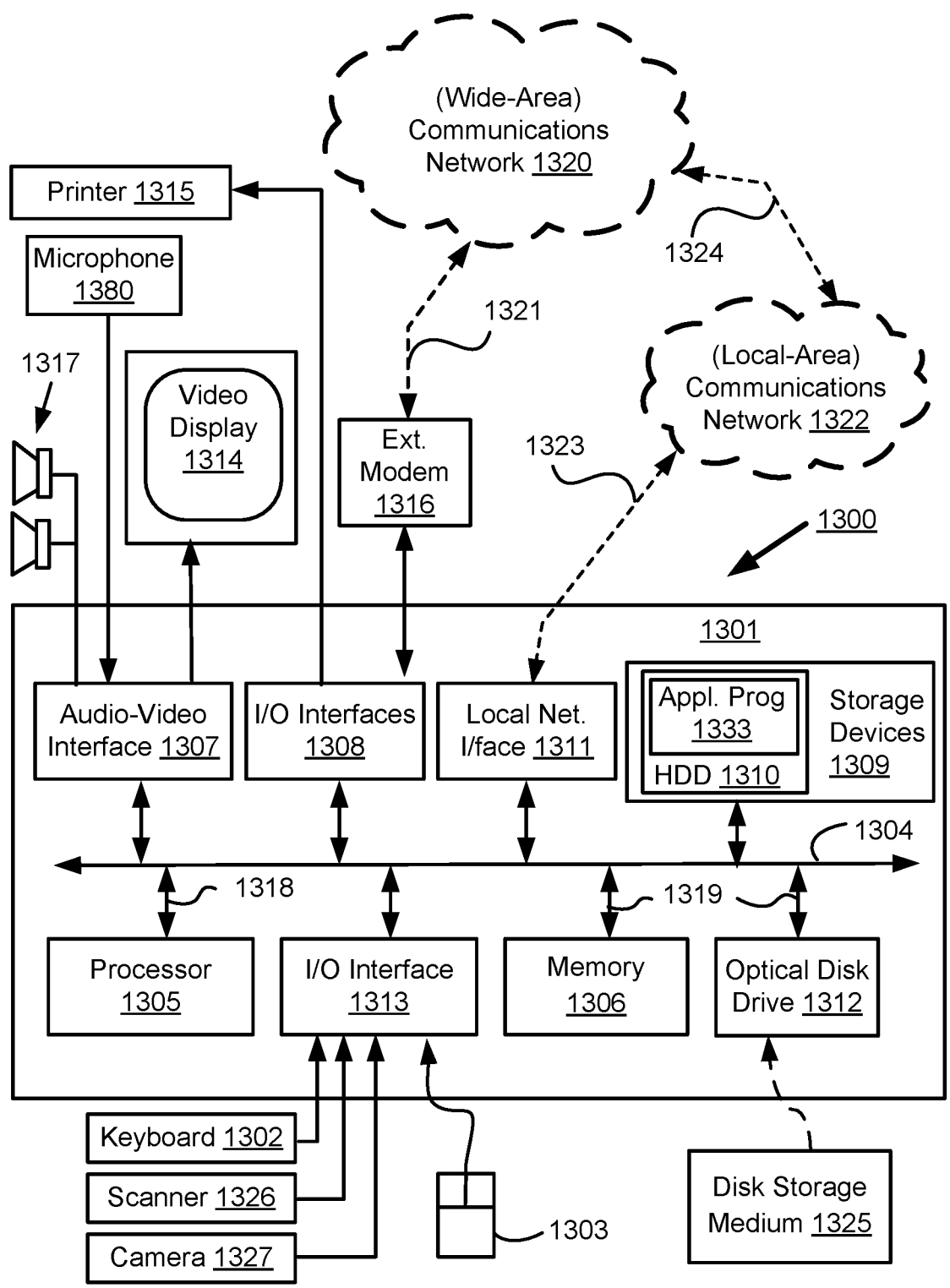
FIGS. 13A and 13B form a schematic block diagram of a general purpose computer system upon which arrangements described can be practiced.
Figure 13B:
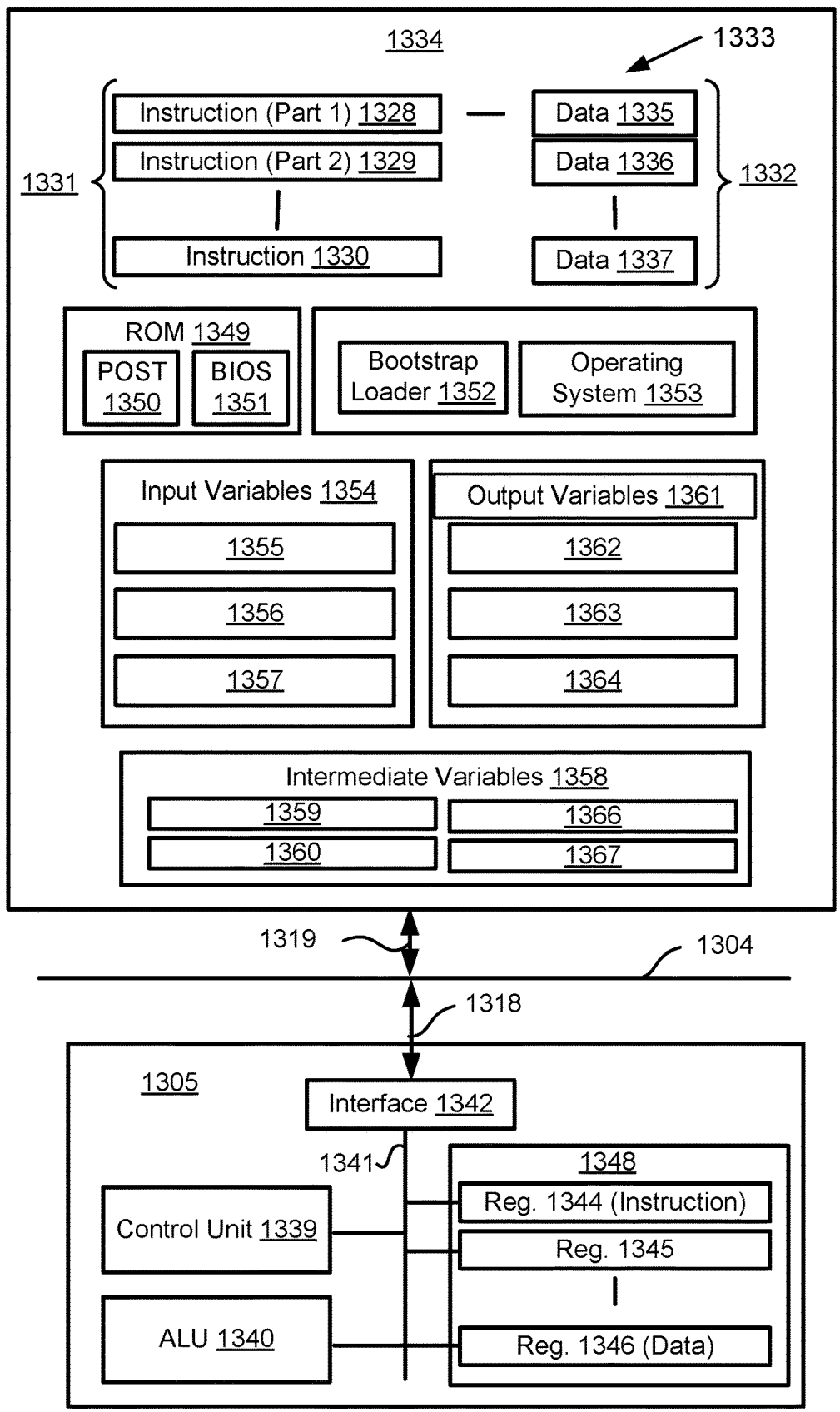

As seen in FIG. 13A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or like computer systems.

The method of stabilizing a video may be implemented using the computer system 1300 wherein the processes of FIGS. 2 to 13, to be described, may be implemented as one or more software application programs 1333 executable within the computer system 1300. In particular, the steps of the method of stabilizing a video are effected by instructions 1331 (see FIG. 13B) in the software 1333 that are carried out within the computer system 1300.

The software instructions 1331 may be formed as one or more code modules, each for performing one or more particular tasks. The software may also be divided into two separate parts, in which a first part and the corresponding code modules performs the video stabilizing methods and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably affects an advantageous apparatus for stabilizing a video.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably affects an apparatus for stabilizing a video.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The disclosed video stabilization arrangements use input variables 1354, which are stored in the memory 1334 in corresponding memory locations 1355, 1356, 1357. The video stabilization arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

a fetch operation, which fetches or reads an instruction 1331 from a memory location 1328, 1329, 1330;

a decode operation in which the control unit 1339 determines which instruction has been fetched; and an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 2 to 13 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The Video Stabilization Method

Figure 2:
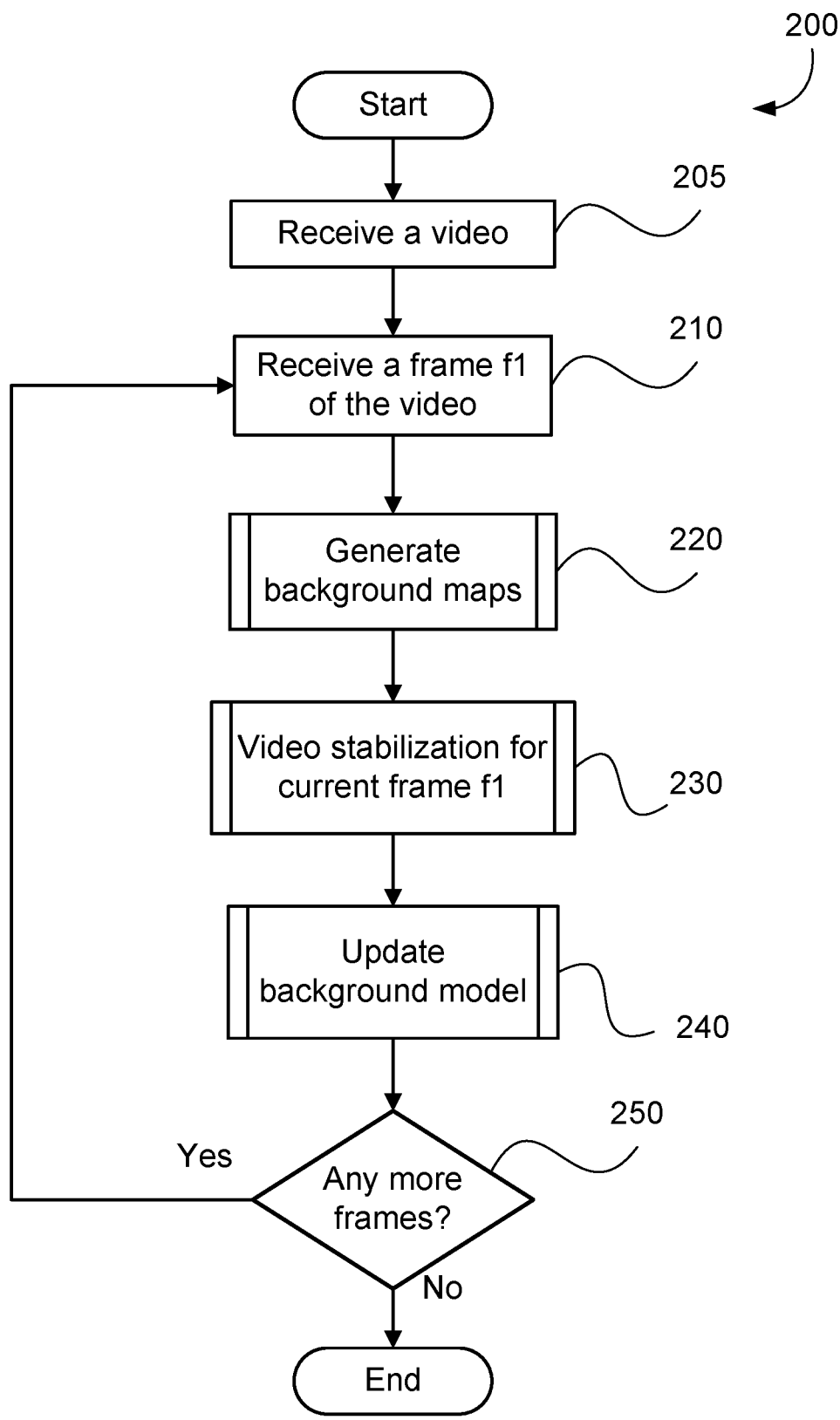
FIG. 2 is a flow diagram of a method of stabilizing a video using background subtraction.

FIG. 2 shows a video stabilization method 200 that handles moving objects and background turbulence effect simultaneously. The method 200 is implemented as one or more software application programs 133 executable within the computer system 1300.

The method 200 commences at step 205 by receiving a video having a sequence of turbulence video frames. The video is received from a long distance imaging device (e.g., the camera 1327). The turbulence video frames of the video are also referred to as the "raw turbulence video frames" hereinafter, when necessary, to differentiate between the raw turbulence video frames and processed video frames.

The method 200 then proceeds from step 205 to step 210, where a current turbulence video frame f1 of the video is received.

The method 200 proceeds from sub-process 210 to sub-process 220, where background maps are generated. The sub-process 220 is described in more detail hereinafter in relation to FIG. 3.

The method 200 proceeds from sub-process 220 to the next sub-process 230. The sub-process 230 uses the generated background maps to correct the current turbulence video frame f1, producing a turbulence corrected current frame f1'. The sub-process 230 is described in more detail hereinafter in relation to FIG. 4.

The method 200 then proceeds from sub-process 230 to sub-process 240, which uses the turbulence corrected current frame f1' produced at sub-process 230 to update the background model. The updated background model helps with future background map generation. The sub-process 240 is described in more detail hereinafter in relation to FIG. 14.

The method 200 then proceeds from sub-process 240 to decision step 250. Step 250 determines whether there are more raw turbulence video frames of the video to be processed. If there are more turbulence video frames to be processed (YES), the method 200 proceeds from step 250 to step 210. Therefore, sub-processes 210 to 240 are performed for each turbulence video frame. Otherwise (NO), the method 200 concludes. At the conclusion of the method 200 a new video with reduced turbulence effect is generated.

Figure 3:
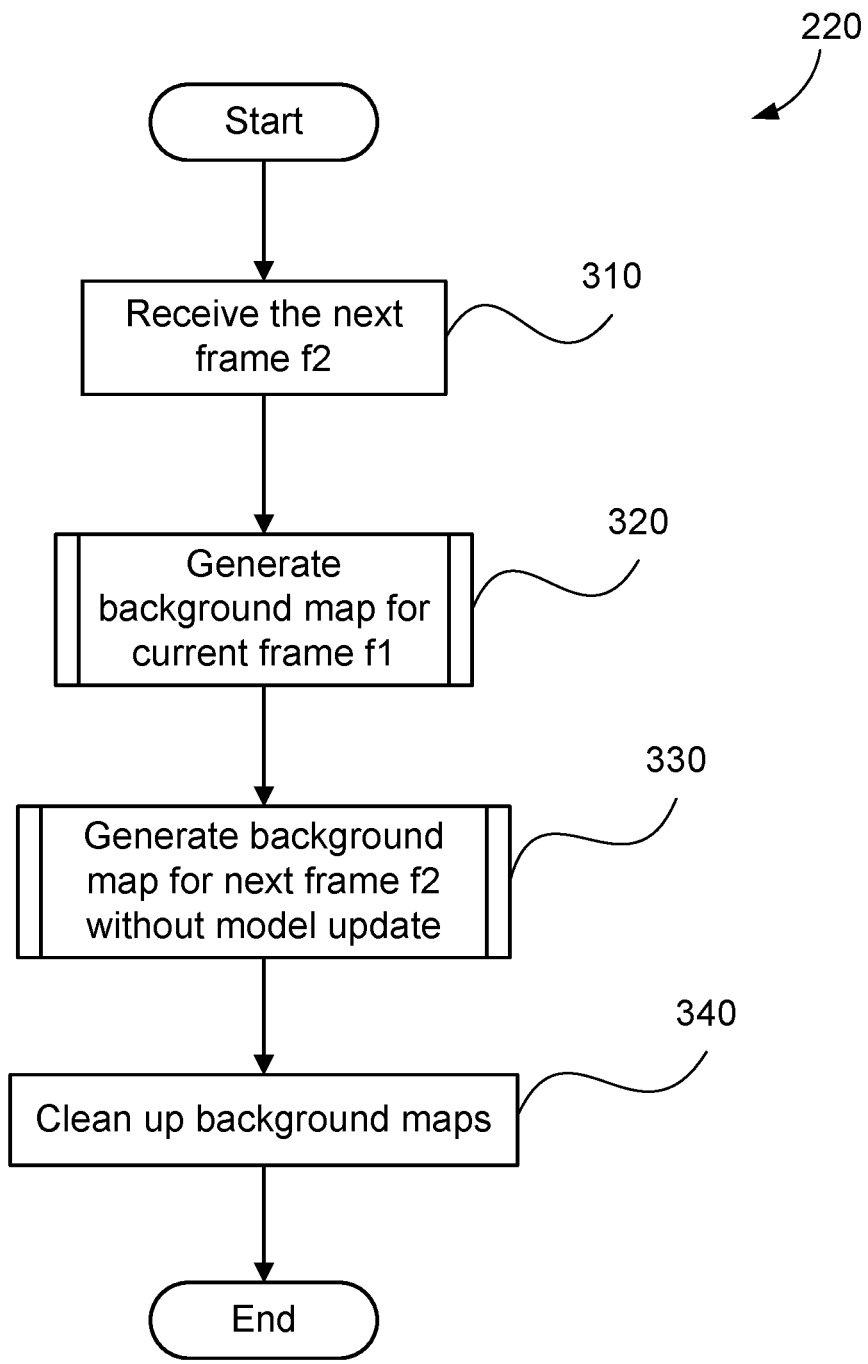
FIG. 3 demonstrates a flow diagram of the background map generation sub-process of the method of FIG. 2.

FIG. 3 shows a flow diagram of the background map generation sub-process 220. The sub-process 220 commences at step 310, where a next frame f2 of the video received at step 210 of the method 200 is received. The next frame f2 may be the next consecutive frame in the video sequence, or in another arrangement may comprise a set of consecutive frames that follow the current frame f1. For simplicity sake, an example of using only the next consecutive frame is used. The sub-process 220 can be extended to use multiple future frames. The sub-process 220 proceeds from step 310 to sub-process 320.

Figure 9:
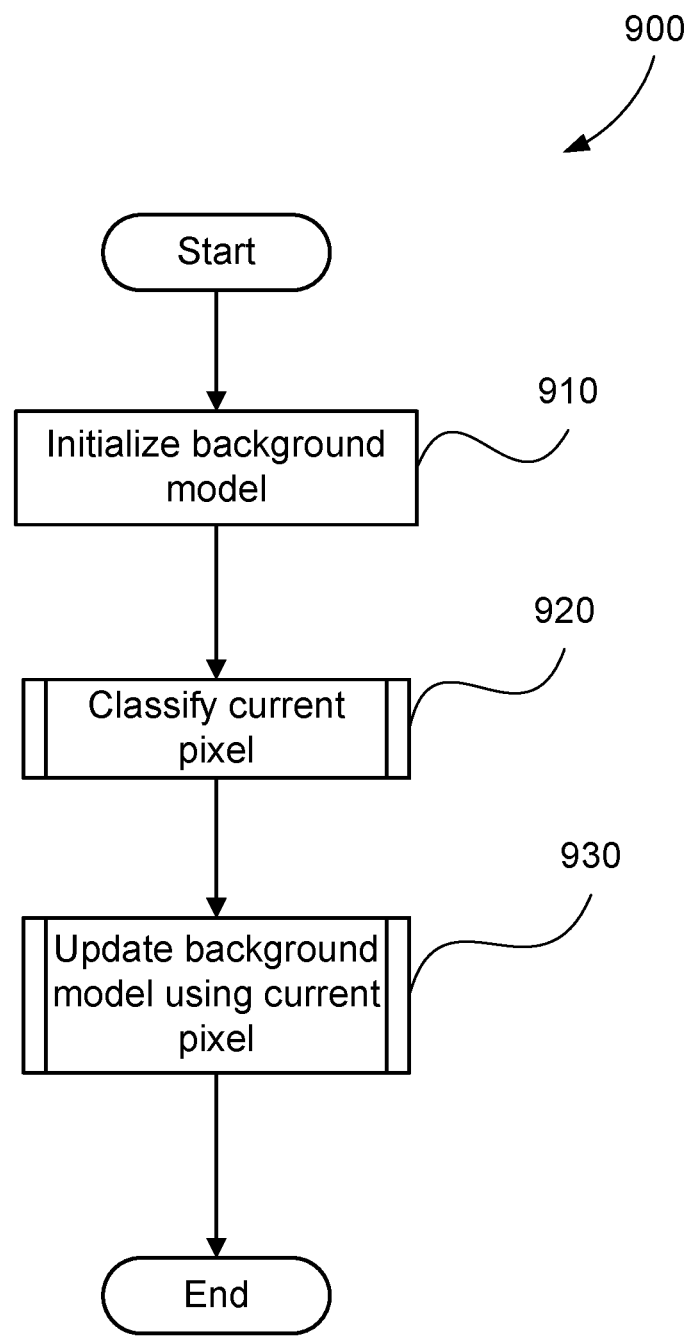
FIG. 9 is a flow diagram of a background subtraction sub-process of the background map generation sub-process of the method of FIG. 3.

Sub-process 320 generates a background map for the current frame f1 using an online background subtraction method (such as a Gaussian Mixture Model (GMM)) or a non-parametric method. A flow diagram of the sub-process 320 is illustrated in FIG. 9.

The sub-process 320 (shown as the method 900 in FIG. 9) commences at step 910 by initializing a background model with a small number of the raw turbulence video frames. In most cases, a single raw turbulence video frame is used. For example, in a GMM background subtraction method, this involves choosing the number of Gaussian distributions and setting the initial weight co, mean $\mu$ and variance $\sigma^{-2}$ for each Gaussian distribution. In a non-parametric method, such as in the ViBe (Visual Background Extractor) method, pixel values in the neighbourhood of the current pixel are selected to form an initial background model in order to jump start background subtraction using a single frame. The sub-process 320 (i.e., the method 900) proceeds from step 910 to sub-process 920.

The sub-process 920 classifies the current pixel as either foreground or background by comparing the current pixel to the current background model. For example, the ViBe method counts the number (cardinality) of nearest neighbours of the current pixel value in the current background model according to a predefined colour distance threshold. The cardinality is then compared to another predefined threshold to determine if the current pixel is similar enough to the current background model. A background or foreground label can then be assigned to the current pixel. Similarly, a typical GMM method compares the current pixel value to each Gaussian distribution that represents background. If the current pixel value sits within $k\sigma$ to the mean value of the Gaussian distribution, where k is typically around 2 and $\sigma$ is the standard deviation, then the current pixel is matched to the Gaussian distribution and thus classified as background. The sub-process 320 (i.e., the method 900) proceeds from sub-process 920 to sub-process 930.

In this arrangement, 'foreground' and 'moving object' are used interchangeably, where 'moving object' is defined as object of interest that causes change in a video: for example vehicles in motion or pedestrians. On the other hand, 'background' in this arrangement refers to still objects in the scene, including roads, buildings, water surface, trees (even if branches are moving on a windy day) etc.

Once the current pixel has been classified, sub-process 930 uses the current pixel to update the current background model. In a GMM method, the current background model is updated as follows:

$$\mu_t = (1-\rho)\mu_{t-1} + \rho X_t$$

$$\sigma_t^2 = (1-\rho)\sigma_{t-1}^2 + \rho(X_t-\mu_t)^T(X_t-\mu_t) \quad [1]$$

That is, the mean of the matched Gaussian distribution is now a linear combination of the previous mean and the current pixel value $X_t$. The weight $\rho$ is a predetermined value that controls the background model update speed and is often referred to as the 'learning rate'. Meanwhile, for a non-parametric method such as ViBe, the current background model is updated using random sampling from a neighbourhood of the current pixel, including the current pixel itself.

A background subtraction method is an 'online' method if the background subtraction method produces a background map for a frame using only a small number of neighbouring frames. In other words, the method has low latency. The user does not need to wait for the video capture device to collect a large number of past and future frames to generate an output for the current frame.

In this disclosure, the term 'current pixel' is used to refer to the input to sub-process 930 for the background model update. It is not limited to pixels in the current frame from the raw input video as in most prior art background model updating schemes. In fact, this disclosure exploits the potential of the 'current pixel' to introduce extra information to the current background model so a feedback network is formed between the background map generation process and the video stabilization process. Once a positive feedback is formed, an improved background map contains fewer artefacts around moving objects in the video stabilization process, resulting in improved turbulence compensation at the sub-process 230. Further, an improved turbulence corrected frame reduces false positive error in foreground detection, therefore producing improved background maps.

Because many online background subtraction techniques are pixel-wise processing, the term 'current pixel' and 'current frame' are sometimes used interchangeably. However, in many GMM-based methods and non-parametric methods, such as the examples given above, the background model may be updated using pixel locations other than the current pixel location. For example, pixels in a small spatial neighbourhood of the current pixel location are often used for classification of the current pixel (in sub-process 920) and background model update (in sub-process 930).

Although FIG. 9 shows an online background subtraction method at a high level, the implementation details in sub-processes 920 and 930 can vary drastically from algorithm to algorithm. The sub-process 930 include steps that enable the simultaneous motion handling and background turbulence compensation. Details of sub-processes 920 and 930 in a background subtraction method are discussed below with reference to FIG. 10 and FIG. 11 respectively. Note in FIG. 10 and FIG. 11, 'current pixel' refers to the current pixel from the raw captured frame of the video.

Figure 10:
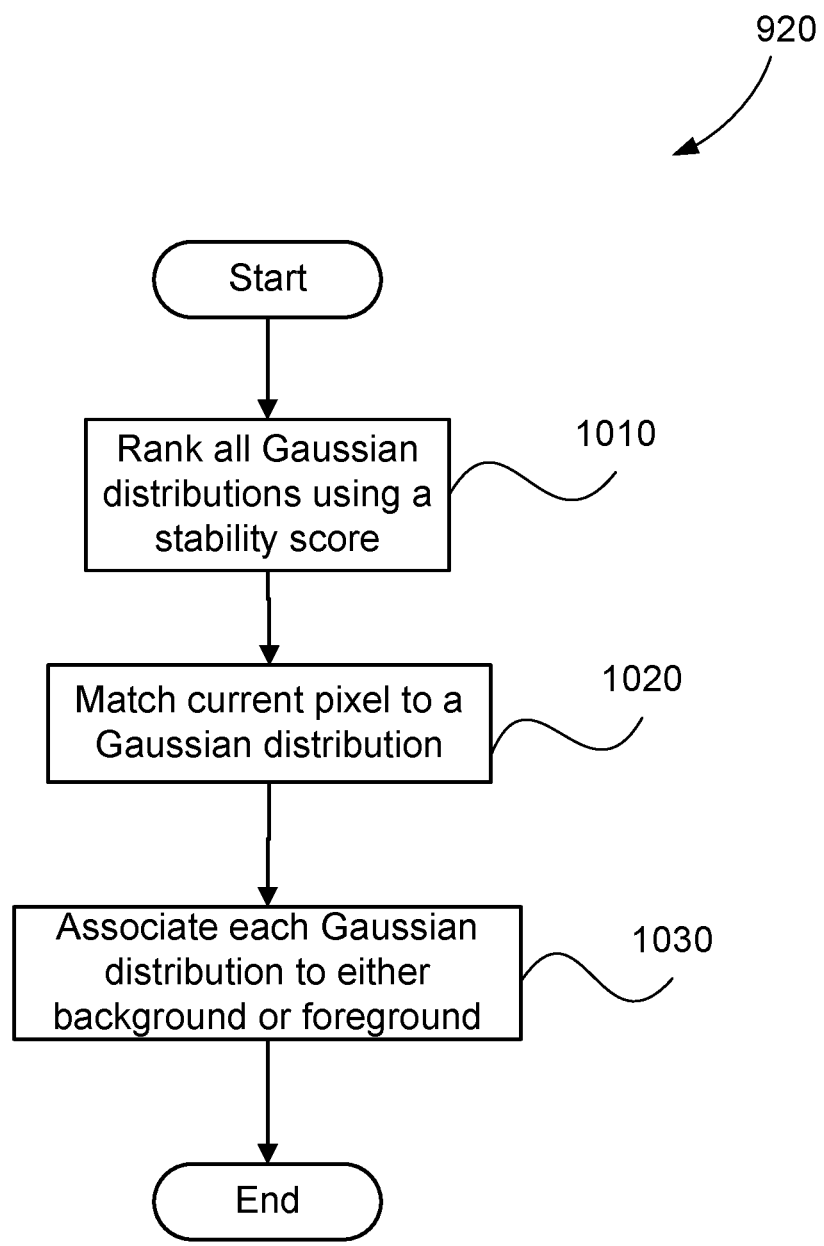
FIG. 10 is a flow diagram of the classification of current pixel using the current background model of the background subtraction sub-process of FIG. 9.
Figure 11:
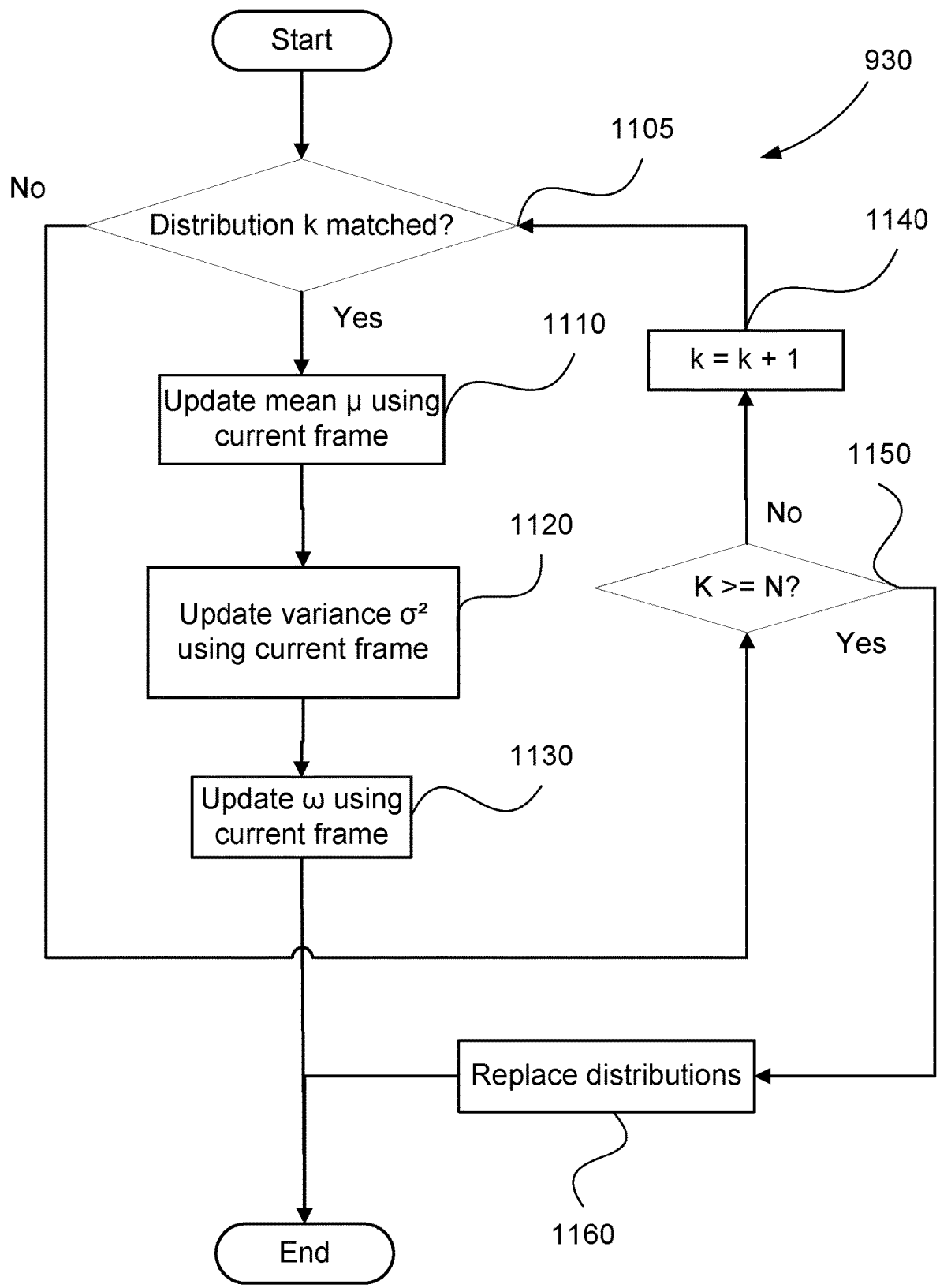
FIG. 11 is a flow diagram of the background model update sub-process of the background subtraction sub-process of FIG. 9.

For simplicity sake, FIG. 10 and FIG. 11 use a GMM background subtraction method as an example. Other online background subtraction methods follow a similar structure. FIG. 10 shows the sub-process 920 for the classification of the current pixel using the current background model, therefore the process is the same regardless of the input pixel value. This is the case for both a GMM background subtraction method and other online background subtraction methods. FIG. 11 illustrates the sub-process 930 for updating the current background model using the current pixel.

As shown in FIG. 10, the sub-process 920 starts at step 1010 by ranking all Gaussian distributions using a stability score. This stability score may be defined as $\omega/\sigma$, where $\omega$ is the weight of a Gaussian distribution and a is the standard deviation of this Gaussian distribution. Once the distributions are ranked from high stability to low stability, the sub-process 920 proceeds from step 1010 to step 1020.

In step 1020, the sub-process 920 compares the current pixel value to the mean value of each distribution from the top of the stability ranking to the bottom. If the current pixel value falls within $k\sigma$ of the mean of a distribution, the current pixel is associated with that distribution. A typical value for k is 2. The sub-process 920 proceeds from step 1020 to step 1030.

In step 1030, the sub-process 920 associates each Gaussian distribution to either background or foreground using its stability ranking and a predefined threshold on the size (pixel numbers) of the background. The step 1030 therefore assigns a 'background' or 'foreground' label to each pixel.

In the case of a typical non-parametric background subtraction method, the current pixel is often compared to a group of pixel values that form the background model. Similarly, a pixel is assigned a 'background' or 'foreground' label in the sub-process 920. The 'current pixel' processed in sub-process 920 is from the current raw frame f1. Sub-process 920 concludes at the conclusion of step 1030. Consequently, sub-process 320 (i.e., the method 900) proceeds from sub-process 920 to sub-process 930.

FIG. 11 shows the background model update in sub-process 930. As discussed above, a GMM background subtraction method is used as an example to explain sub-process 930. As discussed previously, other online background subtraction methods use a similar procedure where a 'current pixel' is used to update the background model.

As shown in FIG. 11, sub-process 930 starts at step 1105 by testing whether the current pixel is matched to a particular Gaussian distribution. The matching process has been described above with reference to step 1020. If it is matched (YES), sub-process 930 proceeds from step 1105 to steps 1110, 1120 and 1130, which collectively update the mean, the variance and the weight of the matched Gaussian distribution using the current raw frame f1 using equation [1]. Sub-process 930 concludes at the conclusion of step 1130. If the current pixel is not matched to a Gaussian distribution (NO), sub-process 930 proceeds from step 1105 to steps 1140 and 1150 to determine whether the current pixel matches to any of the Gaussian distribution by checking all k Gaussian distributions. If none of the existing Gaussian distributions are matched to the current pixel (YES of step 1150), the least stable distribution is replaced with a new Gaussian distribution using a predefined mean, variance and weight in step 1160.

Similarly, when online background subtraction methods other than GMM are used, the current pixel value used to update the background model is from the current raw frame f1.

Sub-process 930 concludes at the conclusion of step 1160. When sub-process 930 concludes, sub-process 320 also concludes and sub-process 220 (shown in FIG. 3) proceeds to sub-process 330.

Sub-process 330 generates the background map for the next frame f2 without model update. As mentioned before, step 310 of the sub-process 220 can receive 2 or more frames that follow the current frame. In this example, a single next frame f2 is used for simplicity. However, the example is extendible to 2 or more frames. For example, if two frames, f2 and f3 are used, the background maps for f2 and f3 can be generated in sub-process 330 without model update. Alternatively, the background model can still be updated after background map is generated for frame f2; sub-process 330 only stops updating the background model after the background map is generated for frame f3. The generation of a background map for the next frame f2 in sub-process 330 is similar to the generation of the current frame f1 in sub-process 320 (as shown in FIG. 9). However, sub-process 330 only implements the first classification step 920. That is, sub-process 330 does not perform the sub-process 930 when generating a background map for the next frame f2. In other words, the background model 'freezes' after the background update step (930) for the current frame f1 in sub-process 320.

Figure 6A:
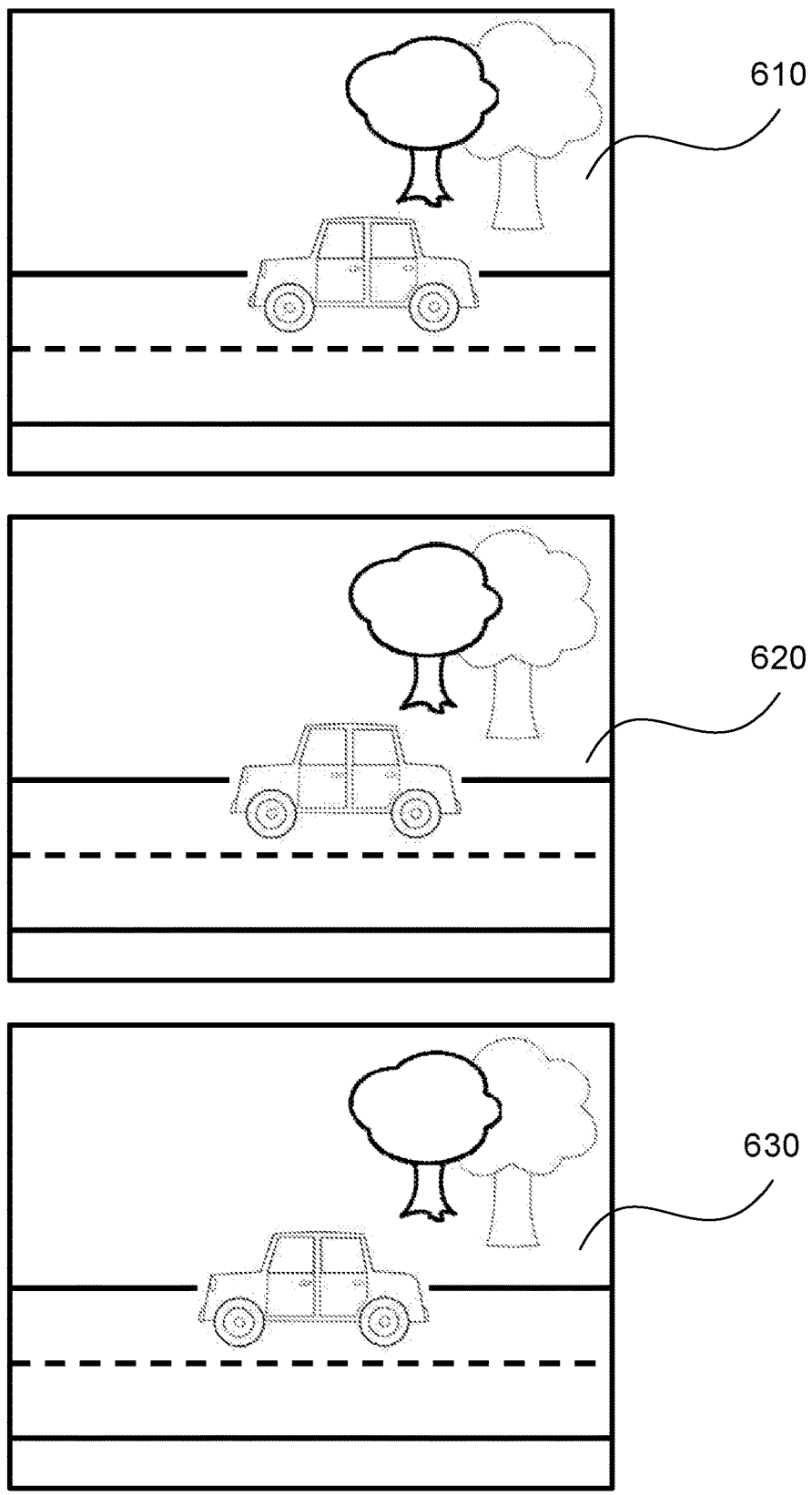
FIG. 6A illustrates captured video frames as the input to the video stabilization method of FIG. 2.
Figure 6B:
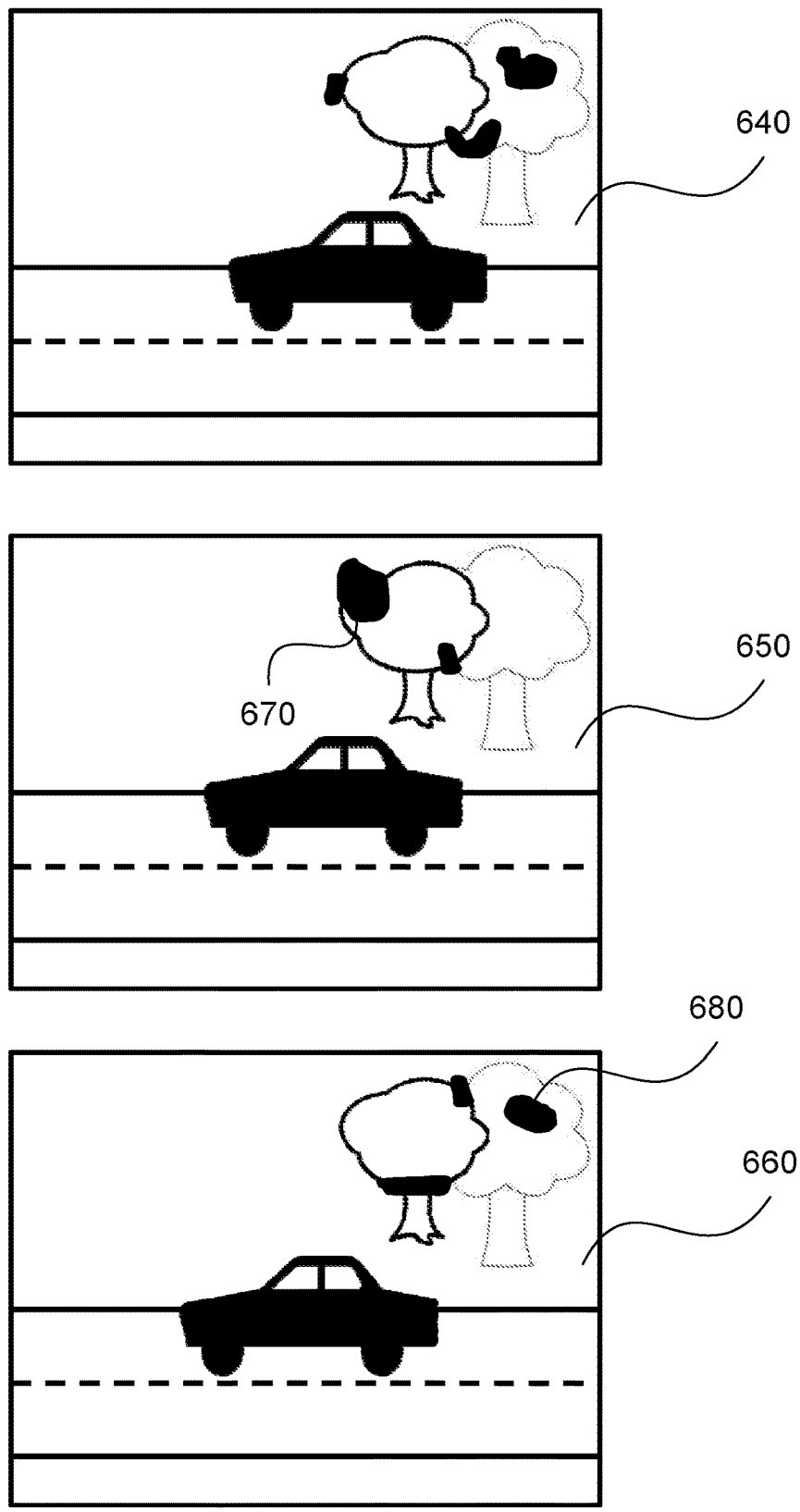
FIG. 6B illustrates a background subtraction result of the raw captured video frames from FIG. 6A using the method of FIG. 2.

FIGS. 6A and 6B show an example of background map generation. FIG. 6A illustrates three consecutive frames 610, 620 and 630 with a moving car in the foreground and trees and road in the background. In FIG. 6B, the dark regions in frames 640, 650 and 660 demonstrate example background detection results for all three frames. Note the false positive foreground in FIG. 6B, for example dark regions 670 and 680 on the trees are in fact not regions of interest in a typical long distance surveillance situation. The trees are not consistently moving therefore should not be considered 'moving objects'. However, many online background subtraction methods generate this kind of false positive foreground due to small periodic movement of the background. In some cases, this small periodic movement is caused by swaying trees or ripples on water surface. In long distance imaging applications, due to the quasi-periodic atmospheric turbulence, this type of small movement is almost always visible in the background, resulting in low image quality. In general, the further away the scene is, the worse the turbulence effect.

Referring back to FIG. 3, after the initial background maps are generated for the current frame f1 and the next frame f2 (i.e., at the completion of sub-processes 320 and 330), the sub-process 220 proceeds from sub-process 330 to step 340. Step 340 cleans up some of the false positive and false negative foreground pixels. For example, background map clean-up may be done using morphological operations such as dilation and erosion. By carefully choosing the size and shape of the structuring elements, some isolated small false positive foreground may be removed and some false negative foreground may be recovered as foreground through connecting foreground regions that are close to each other. In another arrangement, the background map clean-up may alternatively be achieved by using connected component analysis where small connected components are simply discarded.

Background map cleaning in step 340 removes some of the false positive and false negative foreground errors. However, neither morphological operations nor connected component analysis is designed to target turbulence specific error in background subtraction. The effectiveness of the background map clean-up in step 340 is limited to removal of isolated and small foreground blobs. If the background objects have irregularly shaped structures such as thin power cable or texture, large false positive foreground blobs tend to be detected at these locations. The background map clean-up step 340 alone is not capable of removing these false positive foreground detections. The method 200 on the other hand is capable of removing these large, irregularly shaped errors in background subtraction without excessive extra processing. Sub-process 220 concludes at the conclusion of step 340. When sub-process 220 concludes, the method 200 also proceeds from sub-process 220 to sub-process 230.

Figure 4:
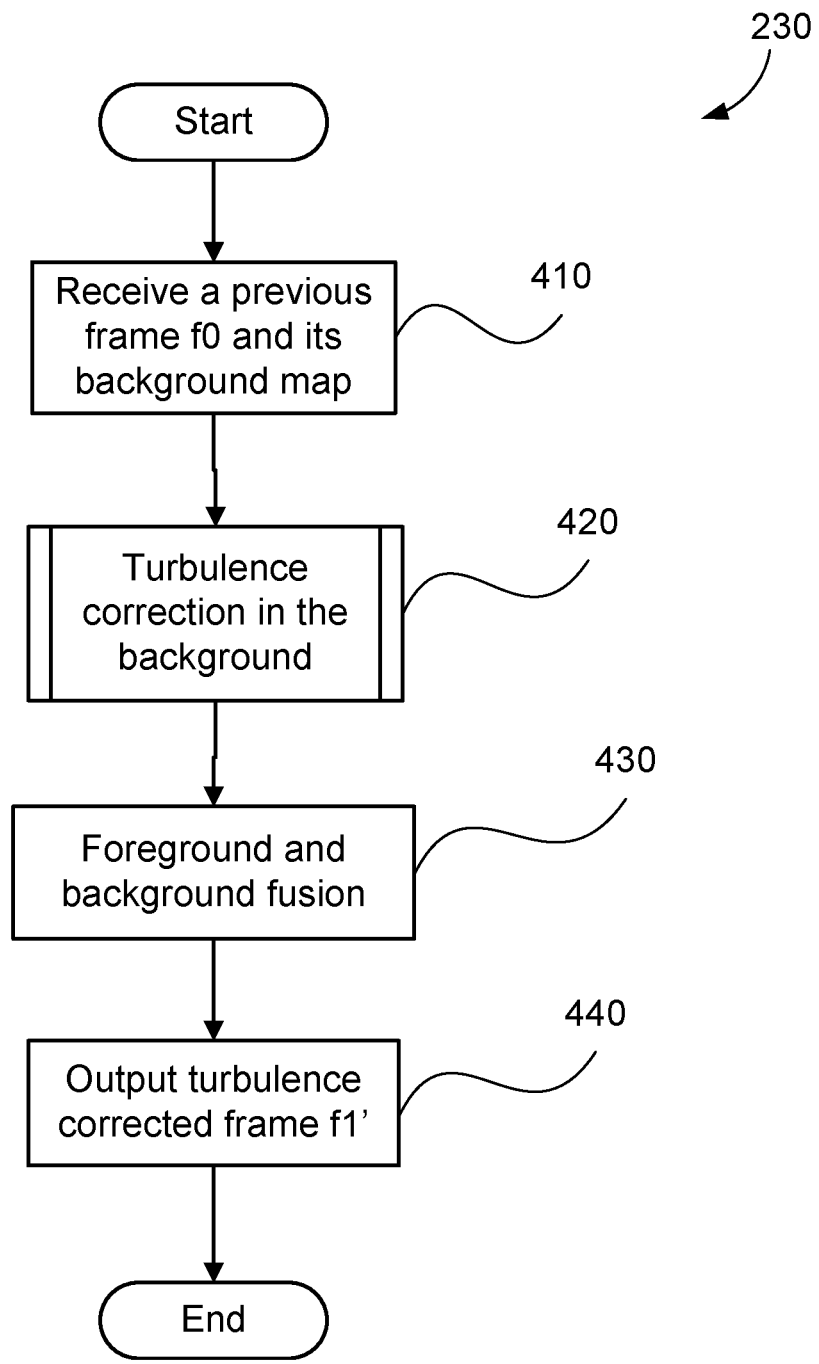
FIG. 4 shows a flow diagram of the video stabilization sub-process of the method of FIG. 2.

Referring back to FIG. 2, after generating background maps for the current frame f1 and the next frame f2 in sub-process 220, sub-process 230 stabilizes the current frame f1 using the generated background maps from sub-process 220. FIG. 4 shows a flow diagram for the sub-process 230.

As shown in FIG. 4, sub-process 230 commences at step 410 by receiving a stored previous frame f0 and a background map associated with the stored previous frame f0. Sub-process 230 then proceeds from step 410 to sub-process 420.

In sub-process 420, the received previous frame f0 and the associated background map are received as inputs to the turbulence correction sub-process 420. The previous frame f0 may be the frame immediately before the current frame f1, or it can be a few frames before the current frame. Similar to the next frame f2, one can also receive more than one previous frame in step 410. Sub-process 420 uses the immediate previous frame for simplicity. However, sub-process 230 can be extended to using multiple previous frames and frames other than the immediate previous frame. Once the raw frames f0, f1, f2 and their corresponding background maps are available, sub-process 420 combines the frames using their background maps to correct for turbulence effect in the background. Details of sub-process 420 are explained with reference to FIG. 12.

Figure 12:
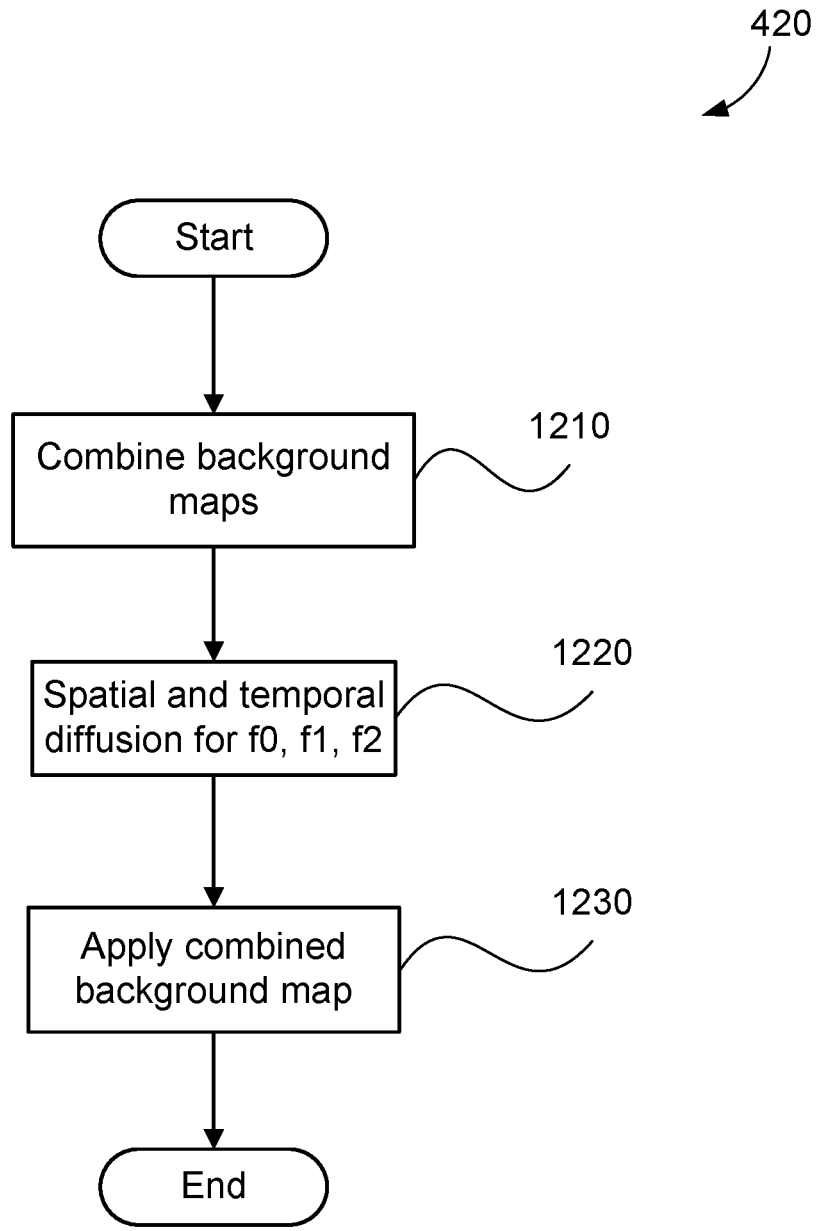
FIG. 12 shows a flow diagram of a turbulence correction sub-process of the video stabilization sub-process of FIG. 4.

As shown in FIG. 12, sub-process 420 commences at step 1210 by combining all the background maps from the raw frames f0, f1 and f2. As mentioned before, different neighbouring frames can be used in step 1210. For example, a 5 frame temporal neighbourhood that is centred at the current frame f1 can be used instead of 3 frames. In general, more frames (a larger temporal neighbourhood) produces better video stabilization effect although this often requires longer processing time. Further, this temporal neighbourhood is not limited to consecutive frames. Neighbouring frames can also be selected in the following fashion: in 9 consecutive frames, select the first, third, fifth, seventh and ninth frame with the current frame being the fifth frame. The background maps are combined using a logical 'AND' operation. That is, a pixel location is only labelled as background if it is classified as background in all the background maps. This generates a combined background map in step 1210. Sub-process 420 proceeds from step 1210 to step 1220.

In step 1220, turbulence in the whole current frame f1 is corrected by using the raw frames f0, f1 and f2. For example, a diffusion method using Sobolev gradient flow spatial diffusion and Laplacian temporal diffusion may be used to stabilize frame f1 and reduce blur. In general, as long as the selected temporal neighbourhood represents a small time slot, the diffusion method in step 1220 is able to effectively correct for turbulence effect. Other turbulence correction methods can also be used in place of the spatial and temporal diffusion method used in step 1220. For example, in another arrangement, a bispectrum method may be applied to combine information from the frames f0, f1 and f2. Generally, any turbulence correction method using multiple frames may be used in step 1220 to compensate for the turbulence effect for the current frame.

In another arrangement, step 1220 may be implemented in a shift-variant fashion to save memory and computation time. Using the combined background map from step 1210, the turbulence correction method may be applied only to pixel locations that are labelled 'background' in the combined background map. An example is the frame averaging method that reduces geometric distortion. Because the operation is pixel-wise, a shift variant turbulence correction means averaging in background regions only. For other turbulence correction methods, however, this may require some extra processing steps. For example, for bispectrum methods, a spatially varying deconvolution kernel needs to be used: in foreground regions, a much smaller deconvolution kernel or even a delta function may need to be assumed.

Step 1220 therefore generates a turbulence corrected frame for the current frame f1. Sub-process 420 proceeds from step 1220 to step 1230.

Figure 7A:
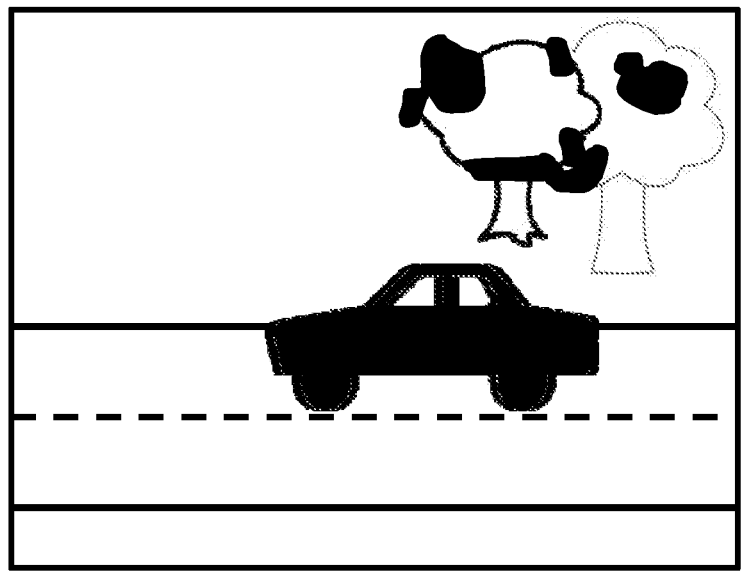
FIG. 7A is a combined background map using a few neighbouring frames using the method of FIG. 2.

As the turbulence correction is applied to the whole of the current frame f1, it is likely that the foreground region with moving objects has some motion blur artefacts. In step 1230 the combined background map is used to mask the foreground region with motion blur artefacts. The output of step 1230 is a turbulence corrected current frame with blank foreground regions. FIG. 7A shows an example output from step 1230 where the turbulence effect in the background has been corrected while the combined foreground regions are set to zeros. Sub-process 420 concludes at the conclusion of step 1230. Sub-process 230 accordingly proceeds from sub-process 420 to step 430.

Referring back to FIG. 4, in step 430, the processed foreground and background are fused together. The background used in step 430 is the output from step 1230 of sub-process 420, shown in FIG. 7A; the foreground used in step 430 is extracted from the raw current frame f1 using the combined background map (dark regions) shown in FIG. 7A.

Figure 8:
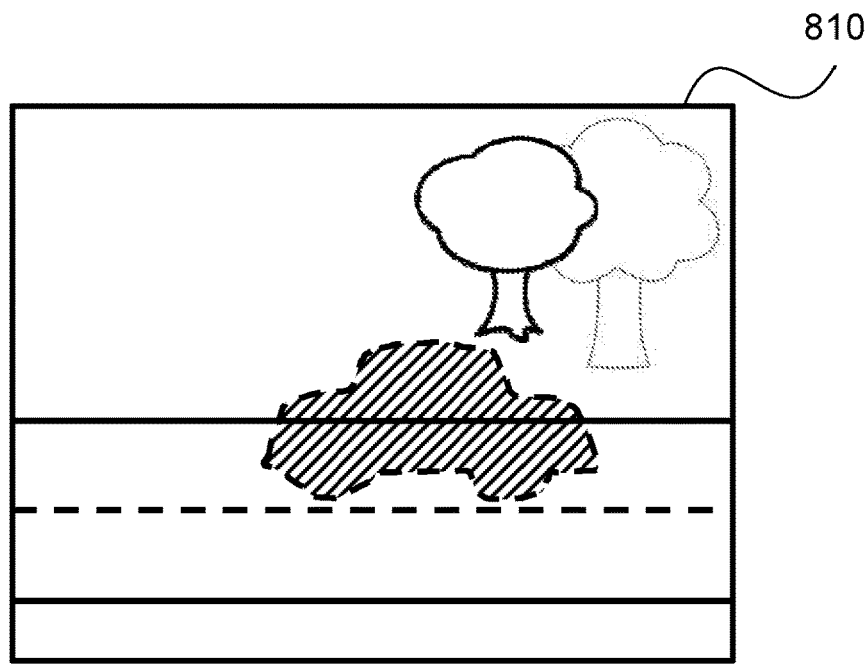
FIG. 8 illustrates the image fusion process where the processed background region is combined with the foreground region in accordance with the method of FIG. 2.
Figure 8:
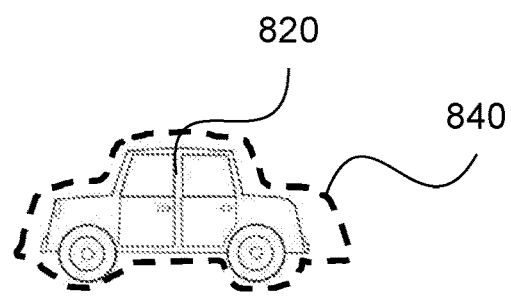
Figure 8:
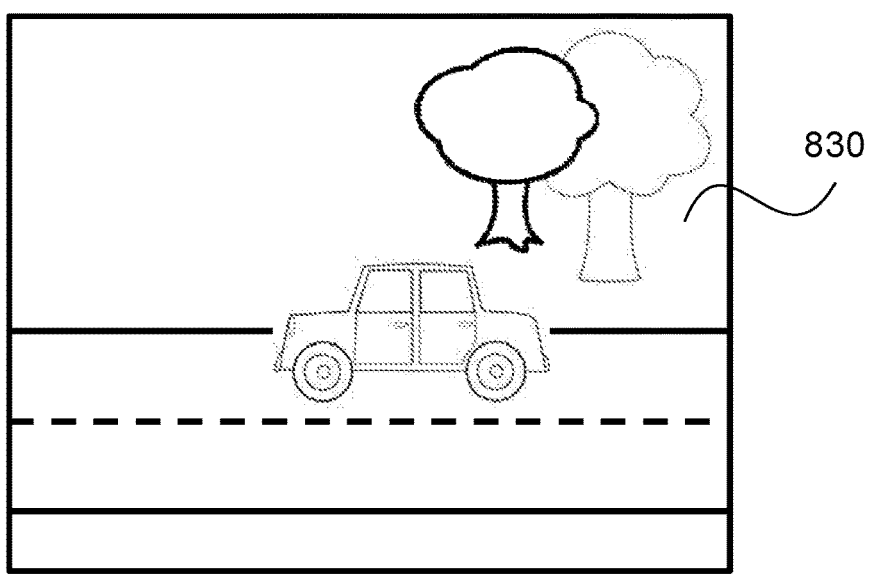

FIG. 8 demonstrates the fusion process of step 430. The background regions such as the trees and the road in the frame 810 is the turbulence corrected background output from step 1230, while the foreground moving car 820 is extracted from the original raw frame f1. Placing the foreground moving car 820 back into the foreground location in the frame (810) produces a fused frame f1' as shown in a fused frame 830. In order to avoid boundary artefacts around the foreground boundary 840, an image fusion technique may be used. For example, a wavelet transform based image fusion method, or a Poisson image editing method may be applied. Sub-process 230 proceeds from step 430 to step 440.

Once the processed background and the original foreground are fused together in step 430, step 440 outputs the fused result as the turbulence corrected frame f1' for the current frame. The combined turbulence corrected frame f1' is not only the final output of turbulence compensation for the current frame f1, it also provides an excellent basis for future background subtraction due to the reduced turbulence effect. Sub-process 230 concludes at the conclusion of step 440. Accordingly, the method 200 proceeds from sub-process 230 to sub-process 240.

Figure 7B:
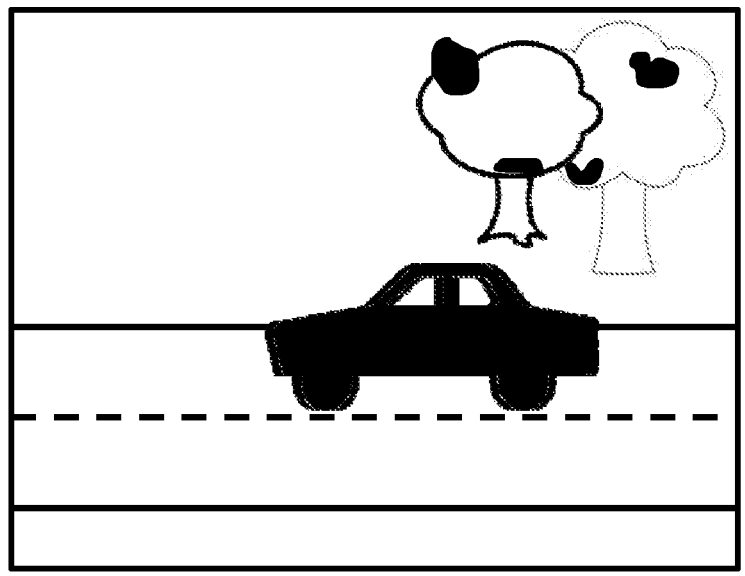
FIG. 7B shows a combined background map using the method of FIG. 2.

Referring back to FIG. 2, recall that in step 220, the background model has been frozen since the background map generation for the current frame f1. Sub-process 240 updates the background model using the turbulence corrected frame f1' from sub-process 230. Because the turbulence corrected frame f1' contains much less turbulence effect than the raw video frames f1 and f2, the generated background map for the next frame f2 has much less false positive foreground pixels. In other words, the background model updated using frame f1' provides a better model to separate still background and moving foreground by removing the influence from atmospheric turbulence. FIG. 7B shows an example combined background map for the next frame f2 using f1' as the update input. Compared to FIG. 7A, the frames shown in FIG. 7B have much less artefacts caused by background turbulence.

More specifically, the background model update sub-process 240 uses the pixel values $X_t$ from f1' instead of from the raw current frame f1 as the input to Equation [1]. Details of sub-process 240 are explained below with reference to FIG. 14.

In the above arrangement, the background model is effectively updated both with the raw current frame f1 during sub-process 220, and with the turbulence corrected frame f1' during sub-process 240. In another arrangement, the background model may be updated only with the turbulence corrected frame f1' by copying and storing the background model parameters before sub-process 220. One advantage of this arrangement is that the background model may have improved false positive foreground performance. However, one disadvantage of this arrangement is that copying the background model requires additional memory.

In yet another arrangement, where 2 or more next frames are used in sub-process 330, the background model update freeze can happen after any 'next frame'. For example, if 2 next frames f2 and f3 are used in sub-process 330, after the background map of f2 is generated, the background model may be updated as in a standard background subtraction method and the background model update only freezes after the background map of f3 is generated. Alternatively, sub-process 330 may stop the background model update after the background map of f2 is generated and sub-process 240 may update the background model later using the turbulence correction current frame f1' from sub-process 230.

Figure 14:
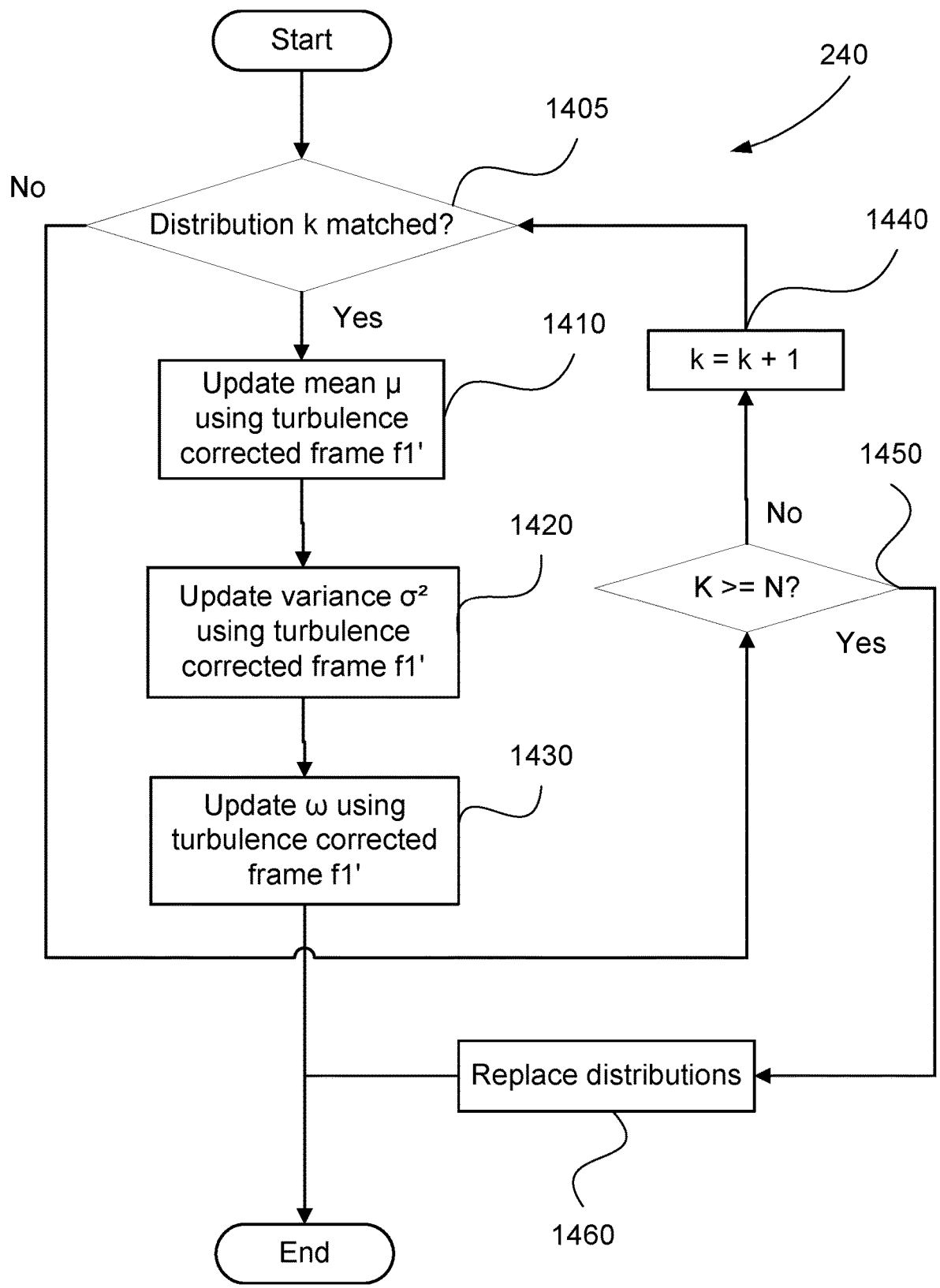
FIG. 14 is a flow diagram of the background model update sub-process of the method of FIG. 2.

FIG. 14 shows a flow diagram of sub-process 240 where GMM background subtraction is used as an example to explain the background model update scheme. As discussed previously, other online background subtraction methods use a similar procedure where a 'current pixel' is used to update the background model. In sub-process 240, the background model is updated using pixel values from the combined turbulence corrected frame f1'.

As shown in FIG. 14, sub-process 240 commences at step 1405 which tests whether the current pixel from the current raw frame f1 is matched to a particular Gaussian distribution. The typical matching process has been explained with reference to step 1020 (see FIG. 10). If the current pixel is matched (YES), sub-process 240 proceeds from step 1405 to steps 1410, 1420 and 1430 to collectively update the mean, the variance and the weight of the matched Gaussian distribution using the combined turbulence corrected frame f1' and the background model update finishes. If the current pixel from the current raw frame f1 is not matched to a Gaussian distribution (NO), sub-process 240 proceeds from step 1405 to steps 1440 and 1450 to determine whether the current pixel matches with the next Gaussian distribution by checking all k Gaussian distributions. If none of the existing Gaussian distributions are matched to the current pixel from the current raw frame f1 (NO of step 1450), the least stable distribution is replaced with a new Gaussian distribution using a predefined mean, variance and weight in step 1460.

Similarly, when online background subtraction methods other than GMM are used, the current pixel value used to update the background model is from the combined turbulence corrected frame f1'.

Sub-process 240 concludes at the conclusion of either step 1430 or 1460. The method 200 proceeds from sub-process 240 to decision step 250.

In decision step 250, the method 200 determines whether the video received at step 205 has any other frames. If yes (YES), the method 200 proceeds from step 250 to step 210 to process the next frame. If not (NO), the method 200 concludes.

By feeding the turbulence corrected output f1' back to the background model in sub-process 240, future background maps become more accurate. In turn, better turbulence correction is possible due to accurate background model thus better background maps. It should be pointed out that because the turbulence corrected output f1' is used as the final video stabilization output as well as the input to background model update for future background map generation, no extra computation or training is needed to improve the background map quality, unlike some of the prior art methods.

The turbulence corrected output frame f1' can be displayed in real-time on a screen or integrated into a final video file for review afterwards.

It is possible to re-apply the background model updated with f1' to the current frame f1 and improve the final video stabilization output for the current frame. However, in practice, because of the positive feedback effect between the background map generation and video stabilization, this is not necessary. As long as information from the turbulence corrected frame f1' is included in the future background model, the quality of the turbulence compensation improves fairly quickly in a few frames.

ALTERNATIVE ARRANGEMENT

In an alternative arrangement, the background turbulence correction sub-process 420 is implemented differently. The details of the alternative implementation are shown in FIG. 5.

Figure 5:
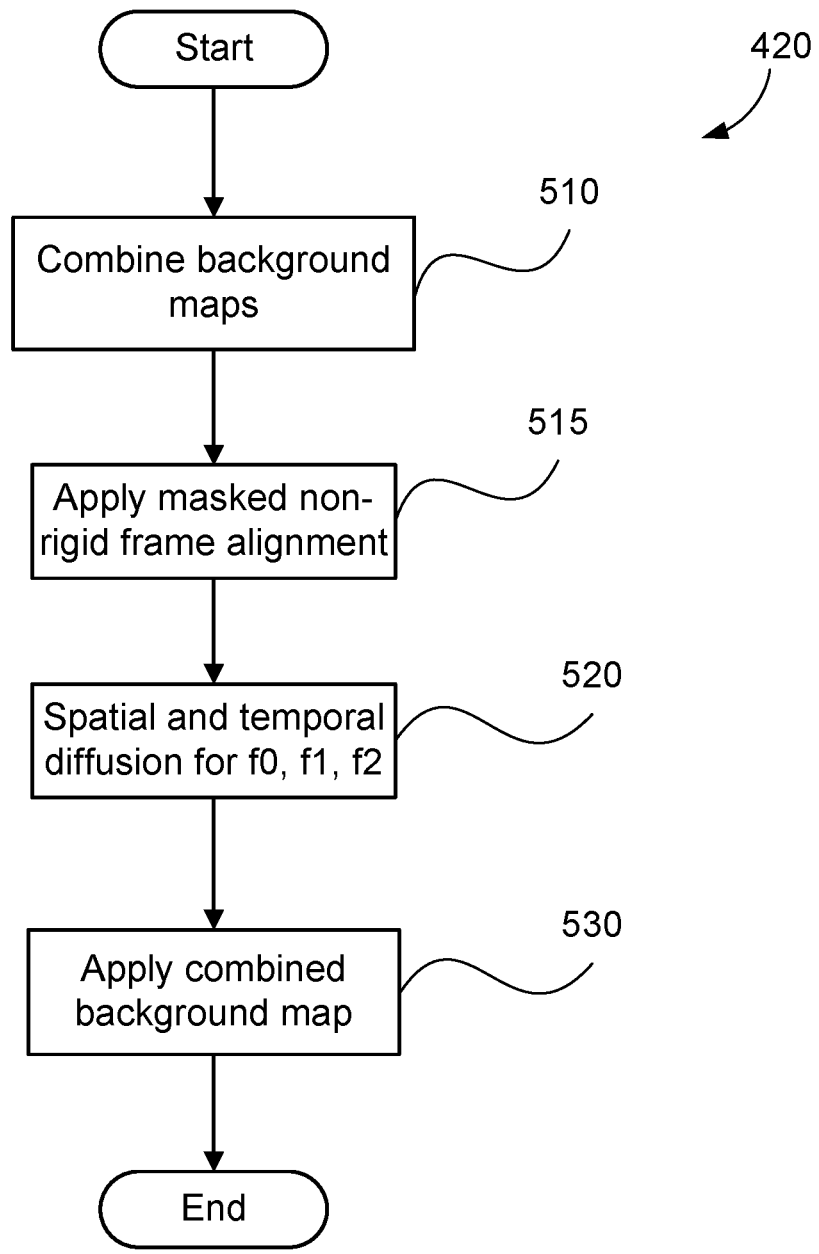
FIG. 5 shows a flow diagram of a turbulence correction sub-process of the video stabilization sub-process of FIG. 4.

As shown in FIG. 5, sub-process 420 commences at step 510 by combining all the background maps from the raw frames f0, f1 and f2. Although only three consecutive frames f0, f1 and f2 are used in this arrangement, other arrangements of frames can be used as described above in relation to FIG. 12. For example, a 5 frame temporal neighbourhood that is centred at the current frame f1 may be used instead of 3 frames. Further, the temporal neighbourhood is not limited to consecutive frames. For example, neighbouring frames may be selected in the following fashion: in 9 consecutive frames, select the first, third, fifth, seventh and ninth frame with the current frame being the fifth frame. The background maps are combined using a logical 'AND' operation. That is, a pixel location is only labelled as background if it is classified as background in all the background maps. This generates a combined background map in step 510.

Unlike the arrangement shown in FIG. 12, sub-process 420 shown in FIG. 5 has a masked non-rigid frame alignment step 515 before a diffusion step 520. The frame alignment is applied to the current frame f1 to correct for strong misalignment caused by various factors: camera shake, strong turbulence, etc. Although referred to as non-rigid frame alignment, the non-rigid frame alignment handles both rigid and non-rigid frame alignment. Typically, the non-rigid frame alignment method will include a rigid alignment step followed by a pure non-rigid alignment step. Because the moving object may be mistaken by the alignment algorithm as misaligned, the combined background map from step 510 is used to mask problematic regions with moving objects for frame alignment. In other words, the foreground regions are excluded from the frame alignment process in step 515.

The masked non-rigid frame alignment aligns the current frame f1 to a reference frame. The reference frame for frame alignment may be calculated using an average frame obtained from a few frames collected at the beginning of the sequence where no moving objects exist. Normally less than 10 frames are needed. In another arrangement, a moving average that is updated every few frames may be used to calculate the reference frame. In yet another arrangement, the reference frame may be calculated with a median, rather than an average. Sub-process 420 proceeds from step 515 to step 520.

After frame alignment, step 520 corrects turbulence in the raw current frame f1 using the raw frames f0, f1 and f2. For example, the spatial and temporal diffusion method can be used to stabilize frame f1 and reduce blur. In general, as long as the selected temporal neighbourhood represents a small time slot, the diffusion method in step 520 is able to effectively correct for turbulence effect. Other turbulence correction methods can also be used in place of the spatial and temporal diffusion method in step 520. For example, in another arrangement a bispectrum method may be applied to combine information from f0, f1 and f2. Generally, any turbulence correction method using multiple frames may be used in step 520 to compensate for the turbulence effect for the current frame.

In another arrangement, step 520 may be implemented in a spatially varying fashion to save memory and computation time. Using the combined background map from step 510, the turbulence correction method may be applied only to pixel locations that are labelled 'background' in the combined background map instead of being applied to all pixel locations. For some turbulence correction methods, this is straightforward. An example is the simple frame averaging method that reduces geometric distortion. Because the operation is pixel-wise, a shift variant turbulence correction simply means averaging in background regions only. For other turbulence correction methods, however, this may require some extra processing steps. For example, for bispectrum methods, a spatially varying deconvolution kernel needs to be used: in foreground regions, a much smaller deconvolution kernel or even a delta function may need to be assumed.

Step 520 generates a turbulence corrected frame for the current frame f1. It should be noted that if the turbulence correction is applied to the whole of the current frame f1, it is likely that the foreground region with moving objects has some motion blur artefacts. Sub-process 420 proceeds from step 520 to step 530.

In step (530) the combined background map is used to mask the foreground region with motion blur artefacts. The output of step 530 is a turbulence corrected current frame with blank foreground regions. Sub-process 420 concludes at the conclusion of step 530.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method of correcting for a turbulence effect in a video comprising a plurality of frames, the method comprising:
   determining a first background region and a region corresponding to a moving object in a first frame of the plurality of frames using a predetermined background model;
   determining a second background region in a second frame of the plurality of frames using the predetermined background model;
   generating a turbulence-corrected background region from the first background region and the second background region, wherein the generating of the turbulence-corrected background region comprises aligning the first frame and the second frame and using alignment data to determine the first background region and the second background region;
   fusing the region corresponding to the moving object and the turbulence-corrected background region to form a turbulence-corrected frame;
   updating the predetermined background model based on the turbulence-corrected frame; and
   correcting for the turbulence effect in the second frame using the updated predetermined background model.

2. The method of claim 1, wherein the correcting step comprises determining a background region and a region corresponding to the moving object in the second frame.

3. The method of claim 1, further comprising applying morphological operators to the determined first and second background regions.

4. The method of claim 1, further comprising applying connected component analysis to the determined first and second background regions.

5. The method of claim 1, wherein the turbulence corrected frame is generated by masking regions based on alignment quality.

6. The method of claim 1, wherein the determination of the first background region and the region corresponding to a moving object in the first frame comprises:
   classifying a current pixel of the first frame; and
   updating the predetermined background model based on the classification of the current pixel.

7. The method of claim 6, wherein the classification of the current pixel of the first frame comprises:
   ranking all Gaussian distributions using a stability score;
   matching the current pixel to one of the Gaussian distributions; and
   associating each of the Gaussian distributions to either background or foreground.

8. A non-transitory computer readable medium comprising a software application program that is executable by a processor, wherein, when executing the software application program, the processor performs a method comprising the steps of:
   determining a first background region and a region corresponding to a moving object in a first frame of the plurality of frames using a predetermined background model;
   determining a second background region in a second frame of the plurality of frames using the predetermined background model;
   generating a turbulence-corrected background region from the first background region and the second background region, wherein the generating of the turbulence-corrected background region comprises aligning the first frame and the second frame and using alignment data to determine the first background region and the second background region;
   fusing the region corresponding to the moving object and the turbulence-corrected background region to form a turbulence-corrected frame;
   updating the predetermined background model based on the turbulence-corrected frame; and
   correcting for the turbulence effect in the second frame using the updated predetermined background model.

9. The non-transitory computer readable medium of claim 8, wherein the correcting step of the method comprises determining a background region and a region corresponding to the moving object in the second frame.

10. The non-transitory computer readable medium of claim 8, wherein the method further comprises applying morphological operators to the determined first and second background regions.

11. The non-transitory computer readable medium of claim 8, wherein the method further comprises applying connected component analysis to the determined first and second background regions.

12. The non-transitory computer readable medium of claim 8, wherein the turbulence corrected frame is generated by masking regions of poor alignment quality.

13. The non-transitory computer readable medium of claim 8, wherein the determination of the first background region and the region corresponding to a moving object in the first frame of the method comprises:
 classifying a current pixel of the first frame; and
 updating the predetermined background model based on the classification of the current pixel.

14. The non-transitory computer readable medium of claim 13, wherein the classification of the current pixel of the first frame comprises:
 ranking all Gaussian distributions using a stability score;
 matching the current pixel to one of the Gaussian distributions; and
 associating each of the Gaussian distributions to either background or foreground.

15. A device comprising a processor and a computer readable medium in communication with the processor, the computer readable medium comprising a software application program that is executable by the processor, wherein, when executing the software application program, the processor performs a method comprising the steps of:
 determining a first background region and a region corresponding to a moving object in a first frame of the plurality of frames using a predetermined background model;
 determining a second background region in a second frame of the plurality of frames using the predetermined background model;
 generating a turbulence-corrected background region from the first background region and the second background region, wherein the generating of the turbulence-corrected background region comprises aligning the first frame and the second frame and using alignment data to determine the first background region and the second background region;
 fusing the region corresponding to the moving object and the turbulence-corrected background region to form a turbulence-corrected frame;
 updating the predetermined background model based on the turbulence-corrected frame; and
 correcting for the turbulence effect in the second frame using the updated predetermined background model.

16. The device of claim 15, wherein the correcting step of the method comprises determining a background region and a region corresponding to the moving object in the second frame.

17. The device of claim 15, wherein the method further comprises applying morphological operators to the determined first and second background regions.

18. The device of claim 15, wherein the method further comprises applying connected component analysis to the determined first and second background regions.

19. The device of claim 15, wherein the turbulence corrected frame is generated by masking regions of poor alignment quality.

20. The device of claim 15, wherein the determination of the first background region and the region corresponding to a moving object in the first frame of the method comprises:
 classifying a current pixel of the first frame; and
 updating the predetermined background model based on the classification of the current pixel.

21. The device of claim 20, wherein the classification of the current pixel of the first frame comprises:
 ranking all Gaussian distributions using a stability score;
 matching the current pixel to one of the Gaussian distributions; and
 associating each of the Gaussian distributions to either background or foreground.

* * * * *